United States Patent
Idbrant et al.

(10) Patent No.: US 10,976,735 B2
(45) Date of Patent: Apr. 13, 2021

(54) SAFETY SYSTEM, METHOD AND COMPUTER PROGRAM FOR REMOTELY CONTROLLED WORK VEHICLES

(71) Applicant: HUSQVARNA AB, Huskvarna (SE)

(72) Inventors: Marcus Idbrant, Kalmar (SE);
Kristian Elofsson, Färjestaden (SE);
Henrik Sihm, Malmö (SE)

(73) Assignee: HUSQVARNA AB, Huskvarna (SE)

( * ) Notice: Subject to any disclaimer, the term of this patent is extended or adjusted under 35 U.S.C. 154(b) by 98 days.

(21) Appl. No.: 16/095,034

(22) PCT Filed: Apr. 20, 2017

(86) PCT No.: PCT/SE2017/050388
§ 371 (c)(1),
(2) Date: Oct. 19, 2018

(87) PCT Pub. No.: WO2017/184068
PCT Pub. Date: Oct. 26, 2017

(65) Prior Publication Data
US 2019/0155278 A1    May 23, 2019

(30) Foreign Application Priority Data
Apr. 21, 2016   (SE) .................................. 1650538-0

(51) Int. Cl.
*G05D 1/00*    (2006.01)
*G08C 17/02*   (2006.01)
(Continued)

(52) U.S. Cl.
CPC .......... *G05D 1/0055* (2013.01); *E02F 9/205* (2013.01); *G01S 3/14* (2013.01); *G01S 5/0284* (2013.01);
(Continued)

(58) Field of Classification Search
None
See application file for complete search history.

(56) References Cited

U.S. PATENT DOCUMENTS

| 5,450,068 A | 9/1995 | Steffen |
| 6,054,950 A | 4/2000 | Fontana |

(Continued)

FOREIGN PATENT DOCUMENTS

| EP | 1 510 403 A2 | 3/2005 |
| EP | 2 843 637 A1 | 3/2015 |

OTHER PUBLICATIONS

O'Keefe, K., et al., "An Investigation of tightly-coupled UWB/Low-Cost GPS for vehicle-to-infrastructure relative positioning," 2014 IEEE Radar Conference, pp. 1295-1300 (May 19, 2014).
(Continued)

*Primary Examiner* — Peter D Nolan
*Assistant Examiner* — Demetra R Smith-Stewart
(74) *Attorney, Agent, or Firm* — Burr & Forman, LLP

(57) ABSTRACT

The present disclosure relates to a safety system (100) for a remotely operated work vehicle (110). The safety system (100) works by continuously establishing a spatial relationship between the work vehicle (110) and a wireless remote control unit (130), wherein at least part of the information needed to establish the spatial relationship is carried as data in signals. The established spatial relationship is then used to control the work vehicle (110).

14 Claims, 9 Drawing Sheets

Fig. 3

(51) Int. Cl.
*E02F 9/20* (2006.01)
*G01S 13/76* (2006.01)
*G01S 3/14* (2006.01)
*G01S 5/02* (2010.01)
*G01S 1/24* (2006.01)

(52) U.S. Cl.
CPC .......... *G01S 13/765* (2013.01); *G05D 1/0016* (2013.01); *G05D 1/0022* (2013.01); *G08C 17/02* (2013.01); *G01S 1/24* (2013.01); *G05D 2201/0202* (2013.01); *G08C 2201/32* (2013.01); *G08C 2201/91* (2013.01)

(56) References Cited

U.S. PATENT DOCUMENTS

| | | | |
|---|---|---|---|
| 6,285,925 B1 | 9/2001 | Steffen | |
| 8,019,223 B2* | 9/2011 | Hudson | G08C 23/00 |
| | | | 398/106 |
| 8,115,650 B2 | 2/2012 | Dasilva et al. | |
| 8,672,582 B2 | 3/2014 | Loew et al. | |
| 9,877,470 B2* | 1/2018 | Crinklaw | G05D 1/0297 |
| 2003/0151508 A1 | 8/2003 | Frame | |
| 2005/0228613 A1 | 10/2005 | Fullerton et al. | |
| 2006/0271263 A1 | 11/2006 | Self et al. | |
| 2008/0027591 A1* | 1/2008 | Lenser | G05D 1/0251 |
| | | | 701/2 |
| 2010/0106344 A1 | 4/2010 | Edwards et al. | |
| 2010/0225541 A1 | 9/2010 | Hertzog et al. | |
| 2016/0353238 A1* | 12/2016 | Gherardi | H04B 1/69 |
| 2017/0308080 A1* | 10/2017 | Brooks | G05D 1/0077 |

OTHER PUBLICATIONS

International Search Report and Written Opinion for International Application No. PCT/SE2017/050388 dated May 5, 2017.
International Preliminary Report on Patentability for International Application No. PCT/SE2017/050388 dated Oct. 23, 2018.

* cited by examiner

|            | Pin1    | Pin2    |
|------------|---------|---------|
| AND gate 1 | GO/NoGO | Forward |
| AND gate 2 | GO/NoGO | Reverse |
| AND gate 3 | GO/NoGO | Right   |
| AND gate 4 | GO/NoGO | Left    |

Fig. 8a

| 1 | 1 |
|---|---|
| 0 | 0 |
| 0 | 1 |
| 1 | 0 |

Fig. 8b

SAFETY SYSTEM, METHOD AND COMPUTER PROGRAM FOR REMOTELY CONTROLLED WORK VEHICLES

TECHNICAL FIELD

The present disclosure relates to safety systems for remotely controlled work vehicles, methods performed in safety systems for remotely controlled work vehicles and corresponding computer programs.

BACKGROUND ART

Remote operation of work vehicles offers many advantages in various work environments. For instance, by operating the work vehicle remotely, accommodation for an operator in or on the work vehicle is no longer necessary. Many work vehicles are also subjected to various types of stress, e.g., vibrations and noise. By remotely operating the work vehicle, the impact of such stresses on the operator can be reduced or eliminated.

However, the size and weight of many of the remotely operated work vehicles combined with the fact that they are mobile implies that there is a risk of injury due to collision between the work vehicle and an operator of the vehicle. One of the most direct ways to reduce the risk of injury is to provide either the work vehicle or an associated wireless remote control with an emergency stop. When the emergency stop is arranged on the work vehicle it is sometimes arranged to stop the work vehicle based on contact with a resistance. Other safety systems have relied on radar principles, wherein infrared or ultrasonic sensors are used to help determining if there is a risk of collision. Such systems often suffer from problems due to interference or limitations in the area that is monitored.

U.S. Pat. No. 8,672,582 B2 discloses an automatic safety system comprising a multipurpose compactor and a movable unit. The movable unit comprises a fixedly coupled transceiver configured to periodically transmit an identification code for reception at the compactor. The transceiver utilizes radio-frequency identification, RFID, technology to communicate with at least one transceiver on the compactor. The compactor comprises transceivers that are adapted to emit a spherical propagation of a protective field. The safety system continuously searches for the presence of an RFID tag within the spherical protective field. Upon detecting an RFID tag, the compactor is stopped. Additionally, if the identification code is not transmitted or received correctly, two drive stop commands to stop the drive of the compactor in both directions is generated.

U.S. Pat. No. 8,115,650 B2 discloses an automatic safety system for collision avoidance between personnel and articulated or mobile industrial machinery. A worker is equipped with an RFID tag and the industrial machinery is equipped with two sensors, wherein the sensors are arranged to determine the distance between the mobile industrial machinery, in particular a moving component on which a sensor is mounted, and the RFID tag. Depending on the determined distance, warning signals are issued or the moving component is slowed down or stopped.

While safety systems based on RFID technology is an improvement over not using any type of radio based safety system, there are drawbacks from using RFID technology, e.g., from characteristics of the antenna of the RFID tag. The power radiated from an antenna in the RFID tag is not isotropic, which means that determining the distance to the antenna is complicated by the lack of isotropic radiation. Furthermore, RFID tag-based distance determining systems depending on a Radio Signal Strength Indicator, RSSI, do not work very well for longer distances, i.e., over about 3 m, because the received signal power drops exponentially with distance. The strong correlation between received power and distance also means that RSSI-systems are quite sensitive to the surrounding geometry in the sense that the system will be more sensitive to reflections other than that of the main signal.

As the distance between a remotely controlled machine and a wireless remote control increases the signal strength between them decreases. Since safe operation of the remotely controlled machine is dependent on control signals from the remote control, there is a need for a safety system operative also when the distance between the remotely controlled machine and a wireless remote control increases and is approaching a maximum safety distance. Thus, there is a need for an automatic safety system that enables varying the safety distance between the work vehicle and the wireless remote control to take into account both a minimum and a maximum safety distance interval, and wherein the distance determination is independent of transmitter strength or antenna shape.

SUMMARY OF THE INVENTION

An object of the present disclosure is to provide systems and methods that enables varying the safety distance between a work vehicle and a wireless remote control to take into account both a minimum and a maximum safety distance interval, and wherein the distance determination is independent of transmitter strength or antenna shape.

The disclosure proposes a safety system for a remotely operated work vehicle, the work vehicle being arranged to receive a first control signal from a wireless remote control unit. The first control signal is arranged to control a drive operation of the work vehicle. The safety system comprises a vehicle unit arranged at the work vehicle and an operator unit arranged at the wireless remote control unit. The vehicle unit is arranged to obtain information relating to a first position of the work vehicle. The operator unit is arranged to transmit at least one signal carrying information relevant for positioning of the wireless remote control unit to the vehicle unit. The vehicle unit is further arranged to determine a spatial relationship between the work vehicle and the wireless remote control unit based on the information relating to a first position of the work vehicle and the information relevant for positioning of the wireless remote control unit. The vehicle unit is also arranged to periodically determine if the spatial relationship meets a predetermined criterion. The vehicle unit is additionally arranged to provide a second control signal to the work vehicle. The second control signal is arranged to control the drive operation of the work vehicle based on the periodic determination.

As has been described in the background section above, there is a need in the art for an automatic safety system that enables varying the safety distance between the work vehicle and the wireless remote control to take into account both a minimum and a maximum safety distance interval. The present disclosure remedies this by keeping the wireless remote control and the vehicle unit in constant communication with each other, with the distance between them being determined periodically. In other words, the wireless remote control will always be inside the protective field of the vehicle unit as long as the wireless remote control and the vehicle unit are within signaling range of each other. Since the wireless remote control is always in communication with the vehicle unit as long as they remain within range of each other, it is possible to introduce distance intervals where different types of control signals are transmitted to the drive control mechanism without having to introduce additional measurement systems, such as e.g. short range radars. In particular, the safety system can be arranged to have an upper limit on the allowed distance, which effectively eliminates the risk of the wireless remote control losing contact with the vehicle unit. This prevents the work vehicle from moving out of range of the wireless remote control, which is a particularly useful feature if the work vehicle is operating in a semi-autonomous mode. Additionally, a need to be able to determine the distance independent of transmitter strength or antenna shape has been identified. The present disclosure addresses this need by relying on information within signals, and possibly information available within or generated by system components, rather than physical properties of the signals, such as e.g. signal power.

According to some aspects, the vehicle unit further comprises a processing element, wherein the processing element is communicatively connected to the drive operation, and wherein the processing element is arranged to control the drive operation of the work vehicle by providing the second control signal. According to some further aspects, the processing element further comprises processing circuitry arranged to receive the information relating to a first position of the work vehicle and the information relevant for positioning of the wireless remote control unit. The processing circuitry is further arranged to determine said spatial relationship and generate the second signal based on whether the spatial relationship the spatial relationship meets the predetermined criterion. The processing element enables coordination of a plurality of control signals and/or processing of information from a plurality of sources. The processing element may also be coupled to a signal receiving unit, e.g. transceiver of the vehicle unit to define a master node via which other nodes of the vehicle unit communicates. In the presence of other work vehicles able to communicate with the transceiver, the master node may also function as a master node for coordinating communication of a plurality of work vehicles exchanging information using the same frequency resources as the transceiver.

According to some aspects, the spatial relationship relates to a first distance between the work vehicle and the wireless remote control unit and in that the predetermined criterion comprises the first distance falling within a predetermined distance interval. According to some further aspects, the second control signal is arranged to stop the work vehicle if the work vehicle enters the predetermined distance interval. The predetermined distance interval may be used to determine how close the operator may be to the work vehicle before it is stopped. The predetermined distance interval may include a maximum safety distance interval, which is an object of the present disclosure. Alternatively, the second control signal is arranged to stop the work vehicle if the work vehicle leaves the predetermined distance interval. The lower bound of the interval then corresponds to a minimum safety distance and the upper bound corresponds to a maximum safety distance. In other words, the work vehicle is allowed to operate as long as the operator does not get too close or too far away from the work vehicle. According to a further aspect, the predetermined distance interval is between 2 m and 50 m.

According to some aspects, the vehicle unit is arranged to determine the first distance using two-way ranging time of flight based on a time stamp based on the information relevant for positioning of the work vehicle that is time stamped at an initial time of the two-way ranging and a and a time stamp based on a received signal that is time stamped at a finishing time of the two-way ranging. The use of a local coordinate system associated with the time of flight based safety system draws on the predetermined spatial relationships between the point on the vehicle unit where the signal initiating the two-way ranging is located with respect to the work vehicle as well as between the transceiver and the wireless remote control unit. The distance in the local system from the origin to the point on the vehicle unit is zero (or some known arbitrary constant) by definition. The time stamp associated with the signal initiating the two way ranging is thus all the information needed to determine the position of the work vehicle at the time of the time stamp, since it is zero by definition. A time stamp requires a minimal amount of data to be stored and/or processed. The information relevant for positioning of the work vehicle may thus only comprise one or more time stamps. Both time stamps can then be used to determine the distance signals have travelled and the work vehicle is stopped if the work vehicle enters the predetermined distance interval. The associated time stamps, in addition to requiring a minimal amount of data to be transferred, may also be used to check the status of the communication link between the vehicle unit and the operator unit. By adding time stamps it is possible to determine if the safety system is receiving reliable results by comparing the time stamps with the present time. Too long time between measurements could indicate problems and the safety system is preferably arranged to take actions to handle this.

According to some aspects, the vehicle unit comprises a first transceiver and the operator unit comprises a second transceiver, wherein the first transceiver is arranged to transmit an initiation signal at said initial time to the second transceiver, and wherein second transceiver is arranged to receive the initiation signal and transmit a response signal to the first transceiver, the response signal comprising said time stamp for finishing time. Alternatively, the signaling is initiated from the second transceiver. The first and second transceivers enable an implementation of a safety system based on time of flight to determine the spatial relationship. In other words, the transceivers enable an implementation of a local coordinate system based on the position of the transceiver at the operator unit with respect to the position of the transceiver at the vehicle unit.

According to some aspects, the information relevant for positioning of the work vehicle and information relevant for positioning of the wireless remote control unit comprise respective global navigational satellite system, GNSS, coordinates obtained from a global navigational satellite system. The GNSS data enables safety operating systems that operate at great distances with high precision. The high precision may be obtained by correcting data from satellites of the GNSS with data from stationary reference points. For instance, the global coordinates may be obtained from a differential global position system, DGPS, where GPS coordinates are corrected using data from fixed positions having known coordinates. The use of a GNSS system enables data relevant for positioning of the wireless device to be pushed, i.e. transmitted without being prompted to do so, to the vehicle unit.

According to some aspects, the vehicle unit comprises a first receiver arranged to receive a vehicle coordinate signal comprising the GNSS coordinates of the position of the work vehicle. The operator unit comprises a second receiver arranged to receive an operator coordinate signal comprising the GNSS coordinates of the position of the wireless remote control unit. According to some further aspects, the first and second receivers are further arranged to receive corrective information, the corrective information being based on predetermined GNSS coordinates of at least one reference point. The vehicle unit is further arranged to improve the accuracy of the GNSS coordinates of the positions of the work vehicle and the wireless remote control unit based on the corrective information. The first and second receivers enable an implementation of a safety system based on coordinates from a global navigation satellite system. In other words, the transceivers enable an implementation of a global coordinate system based on the received GNSS coordinates. The corrective information improves the accuracy of the GNSS coordinates.

According to some aspects, the information relevant for positioning of the work vehicle comprises information relating to a second position of the work vehicle, wherein the spatial relationship further relates to a second distance between the work vehicle and the wireless remote control unit based on the second position. The predetermined criterion further comprises the second distance falling within a second predetermined distance interval. Determining two distances provides redundancy. In other words, if one determined position indicates a problem in determining that distance, the other determined distance may provide the necessary information for continued operational use of the safety system. By determining two distances, it is possible to arrange the safety system to detect if the operator (holding the wireless remote control unit) is standing in front or behind the work vehicle. In aspects based on time of flight for distance determination between the work vehicle and the wireless remote control unit, additional determined distances reduce the impact of human blocking, wherein human blocking refers to the time delay associated with a signal passing through the human body. Signals travelling along different paths will be affected differently by human blocking and more determined distances may be used to reduce the probability that all signals will be affected by human blocking.

According to some aspects, the vehicle unit and the wireless remote control unit each comprises direction detection means arranged to determine a direction of the work vehicle and the wireless remote control unit, respectively, wherein the vehicle unit is further arranged to determine a relative direction between the determined directions of the work vehicle and the wireless remote control unit. The vehicle unit is also arranged to stop the work vehicle based on a predetermined relative direction criterion. This enables stopping the work vehicle if an operator holding the wireless remote control unit is facing in a direction deemed unsafe. For instance, the work vehicle may be stopped if the operator has his/her back to the work vehicle. It further enables detecting if the operator is at risk of losing focus of the task of operating the work vehicle, e.g. by rotating in a direction away from facing the work vehicle.

According to some aspects, the operator unit comprises a first orientation sensor, wherein the first orientation sensor is arranged to determine an acceleration and/or a change in orientation of the wireless remote control unit, and wherein the vehicle unit is arranged to stop the work vehicle based on the determined acceleration and/or change in orientation meeting at least one predetermined criterion. It is possible that an operator falls or loses control of the wireless remote control. The first orientation sensor enables registering unsafe changes in the conditions by which the wireless remote control is handled. According to some aspects, a signal indicating that the wireless remote control has fallen is transmitted to the vehicle unit based on the predetermined criterion. The vehicle unit is arranged to stop the work vehicle in response to the received signal.

According to some aspects, the vehicle unit comprises a second orientation sensor arranged to provide the vehicle unit with information relating to roll, pitch and heading of the work vehicle, wherein the vehicle unit is further arranged to stop the work vehicle based on the information relating to roll, pitch and heading of the work vehicle meeting at least one predetermined criterion.

According to some aspects, vehicle unit comprises a temperature sensor, wherein the temperature sensor is arranged to provide the vehicle unit with information relating to a temperature of the work vehicle, wherein the vehicle unit is further arranged to provide at least one second control signal based on the information relating to said temperature of the work vehicle meeting a predetermined criterion.

By taking into account temperature and/or roll, pitch and heading of the work vehicle the operational status of the work vehicle may be factored in when determining whether to stop the work vehicle. By monitoring the temperature, the internal components of the work vehicle can be kept in an interval that ensures proper functionality. In particular, parts of the safety system arranged at the work vehicle can be kept within a predetermined temperature interval suitable for reliable operation of the safety system. The roll, pitch and heading can be used to determine if the work vehicle is in danger of e.g. falling over.

The disclosure also relates to a method performed in a safety system for a remotely operated work vehicle, the work vehicle being arranged to receive a first control signal from a wireless remote control unit. The first control signal is arranged to control a drive operation of the work vehicle. The safety system comprises a vehicle unit arranged at the work vehicle and an operator unit arranged at the wireless remote control unit. The method comprises obtaining information relating to a first position of the work vehicle. The method further comprises transmitting at least one signal carrying information relevant for positioning of the wireless remote control unit to the vehicle unit. The method also comprises determining a spatial relationship between the work vehicle and the wireless remote control unit based on the information relating to a first position of the work vehicle and the information relevant for positioning of the wireless remote control unit. The method additionally comprises periodically determining if the spatial relationship meets a predetermined criterion and providing a second control signal to the work vehicle. The second control signal is arranged to control the drive operation of the work vehicle based on the periodic determination. The disclosed method carries out method steps corresponding to what the functional units of the disclosed safety system are arranged to perform. The disclosed method thus has all the advantages associated with the disclosed safety system.

According to some aspects, determining the spatial relationship further comprises determining a first and a second distance between the work vehicle and the wireless remote control unit. Periodically determining if the spatial relationship meets a predetermined criterion further comprises, for each of the first and second distances, determining if at least one of the first and second distances falls within a predetermined distance interval. Providing a second control signal to the work vehicle further comprises arranging the at least one second control signal to stop the work vehicle if at least one of the first and second distances fall within the predetermined distance interval and fall within a second predetermined distance interval. The first and distances provide redundancy to the method. By determining two distances between the work vehicle and the wireless remote control unit, accuracy can be improved with respect to only determining a single distance. By also providing a second predetermined distance interval, the method can take into account the possibility of one of the two determined distances not being properly provided and that the accuracy related to having two distances is lost.

According to some aspects, the method further comprises obtaining information relating to roll, pitch and heading of the work vehicle and arranging the at least one second control signal to stop the work vehicle if at least one of the roll, pitch and heading meets a predetermined criterion. The associated advantages have been described above in relation to the second orientation sensor.

The disclosure also relates to a computer program comprising computer program code which, when executed, causes a safety system according to the present disclosure to carry out an aspect according to the disclosed method. The computer program has all the advantages of the disclosed method.

BRIEF DESCRIPTION OF THE DRAWINGS

FIG. 8 illustrates control signaling according to some aspects;

DETAILED DESCRIPTION

In the following description the wording "arranged at" is to be understood as comprising "arranged on" and "arranged in" as well as being "arranged in proximity to", e.g. by the use of a distancing element, unless otherwise stated. For instance, a transceiver "arranged at" the work vehicle may be arranged partially or completely in the work vehicle. An example of "partially in" could be the transceiver being arranged in the work vehicle with an antenna of the transceiver extending outside of the work vehicle. The transceiver may also be arranged on the work vehicle, e.g. mounted on a surface of the work vehicle. It is sometimes preferable to mount e.g. a signal transmitting or receiving unit at a distance from the work vehicle to reduce the impact of signal obstruction from dirt and work vehicle components and "arranged at" is to be understood to include such cases as well.

Figure 1:
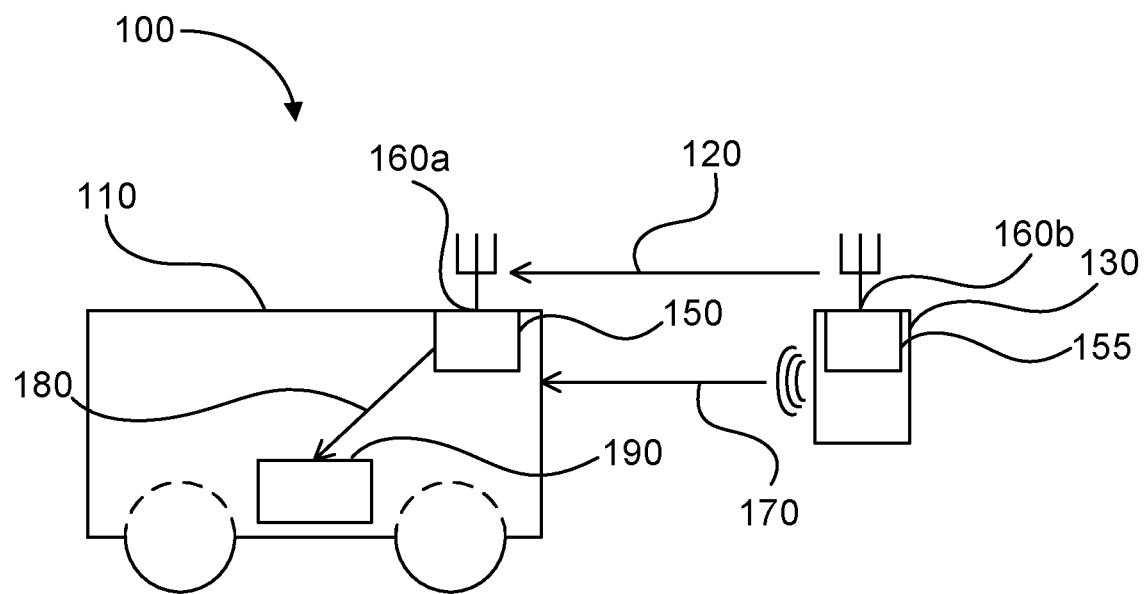
FIG. 1 illustrates a safety system for a remotely operated work vehicle according to the present disclosure.

FIG. 1 illustrates a safety system 100 for a remotely operated work vehicle 110. FIG. 1 illustrates the main principles of the disclosed safety system. The work vehicle 110 is arranged to receive a first control signal 170 from a wireless remote control unit 130, the first control signal 170 being arranged to control a drive operation 190 of the work vehicle 110. The control of a drive operation may comprise affecting a functioning of engine. For instance, the engine may be regulated to slow down or stop the work vehicle. In case the engine is a hydraulic engine, the control of the drive operation may comprise controlling a hydraulic valve arranged to control the flow of hydraulic fluid to and/or from the hydraulic engine. As will be illustrated further below, the safety system 100 works by continuously establishing a spatial relationship between the work vehicle 110 and the wireless remote control unit 130, wherein at least part of the information needed to establish the spatial relationship is carried as data in signals. The established spatial relationship is then used to control the work vehicle 110.

The safety system 100 comprises a vehicle unit 150 arranged at the work vehicle 110 and an operator unit 155 arranged at the wireless remote control unit 130. Both the vehicle unit 150 and the operator unit 155 are functional units that are arranged to interact with the work vehicle 110 and the wireless remote control 130, respectively, and they may comprise a plurality of functional elements that are arranged at different parts of the work vehicle 110 and the wireless remote control unit 155, respectively. For instance, the vehicle unit 150 may comprise a pair of transceivers arranged at different positions of the work vehicle 110, which will be illustrated further below. The vehicle unit 150 is arranged to obtain information relating to a first position 160a of the work vehicle 110. Ways of obtaining said information will be illustrated below in relation to following figures. The operator unit 155 is arranged to transmit at least one signal 120 carrying information relevant for positioning of the wireless remote control unit 130 to the vehicle unit 150.

The vehicle unit 150 is further arranged to determine a spatial relationship between the work vehicle 110 and the wireless remote control unit 130 based on the information relating to a first position 160a of the work vehicle 110 and the information relevant for positioning of the wireless remote control unit 130. The vehicle unit 150 is also arranged to periodically determine if the spatial relationship meets a predetermined criterion. The predetermined criterion may comprise a distance interval between the work vehicle 110 and the wireless remote control unit 155 in which operational use of the work vehicle is considered safe. The vehicle unit 150 is additionally arranged to provide a second control signal 180 to the work vehicle 110, wherein the second control signal 180 is arranged to control the drive operation 190 of the work vehicle 110 based on the periodic determination.

The spatial relationship may be a distance between the work vehicle 110 and the wireless remote control unit 130. The predetermined criterion may be a distance interval in which the distance between the work vehicle 110 and the wireless remote control unit 130 is considered unsafe. In other words, an operator holding the wireless remote control unit 130 is considered to be too close to the work vehicle 110 for operational use of the work vehicle 110 to be considered safe. Conversely, the predetermined criterion may be a distance interval at which operational use of the work vehicle 110 is considered safe. The safety system 100 may then slow down or stop the work vehicle 110 if the operator is either getting too close or too far away from the work vehicle 110.

The predetermined criterion may be stored in a dedicated memory arranged at the vehicle unit 150. The predetermined criterion may be arranged at the vehicle, e.g. stored in said memory, prior to initiating operational use of the safety system 100. According to some aspects, the vehicle unit 150 comprises an interface where the predetermined criterion may be defined. The interface may comprise a user interface, e.g. a touch screen display, enabling an operator to enter parameters relating to the predetermined criterion. The interface may also comprise a software interface, where software may be entered into the vehicle unit 150, e.g. stored in said memory, wherein the software is arranged to determine the predetermined criterion.

Figure 2:
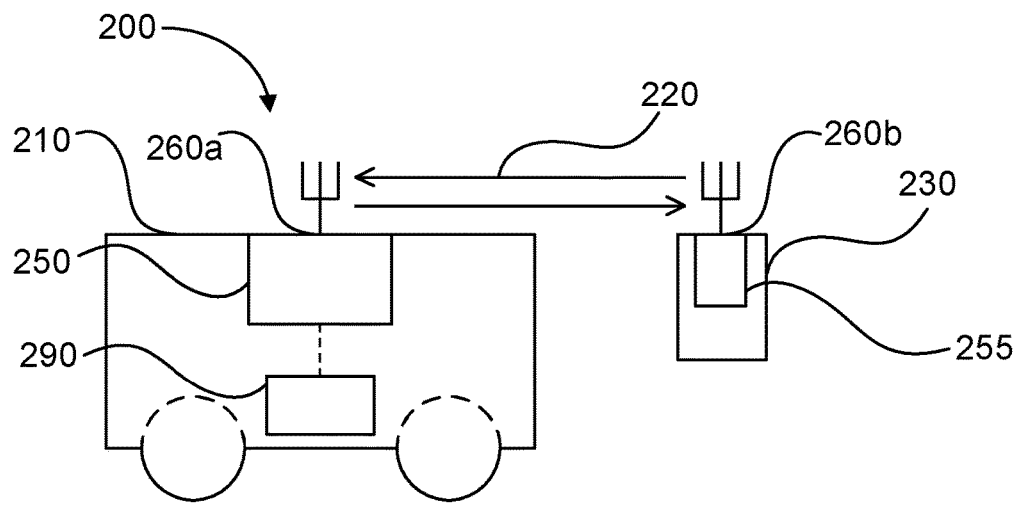
FIG. 2 illustrates a safety system for a remotely operated work vehicle according to the present disclosure.
Figure 3:
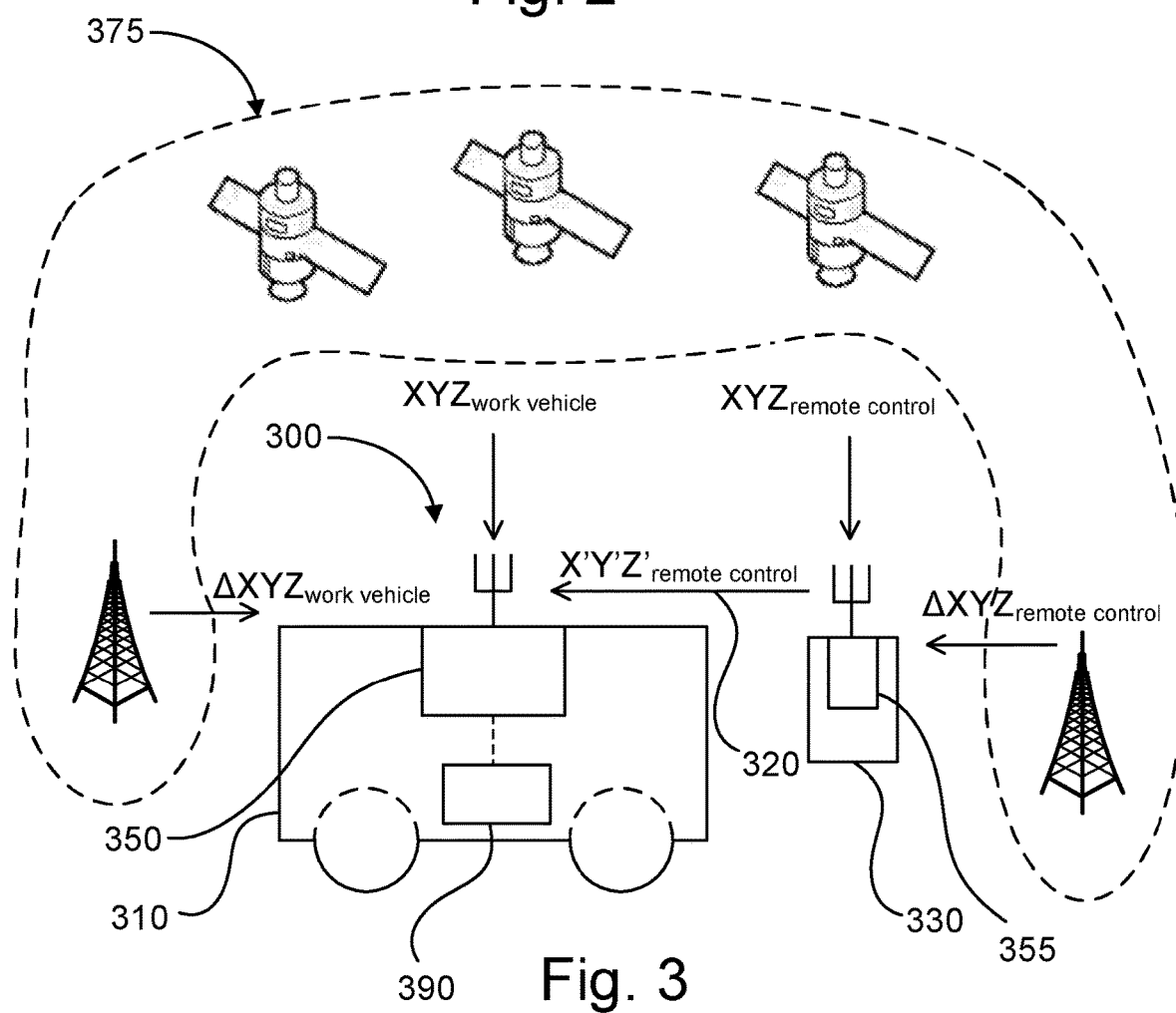
FIG. 3 illustrates a safety system for a remotely operated work vehicle according to the present disclosure.

Determination of the distance between the work vehicle 110 and the wireless remote control unit 130 can be based on either a local coordinate system or a global coordinate system. Furthermore, signals carrying data necessary for determining the distance can be received by the vehicle unit 150 either via a pull-operation or a push-operation. FIGS. 2 and 3 below will illustrate safety systems based on local coordinate systems and global coordinate systems, as well as using pull-operations vs using push-operations for transmitting signals carrying information relevant for positioning of a wireless remote control unit to a vehicle unit.

FIG. 2 illustrates a safety system 200 for a remotely operated work vehicle 210, where the distance determination is based on a local coordinate system and a vehicle unit 250 comprising a transceiver is arranged to receive a signal by using a pull-operation, wherein the signal carries information relevant for positioning of a wireless remote control unit 230. The illustrated safety system 200 is based on two way ranging time of flight, ToF, to determine a distance between the work vehicle 210 and the wireless remote control unit 230. A signal is transmitted from the transceiver at the vehicle unit 250 and a first time stamp is generated. The time stamp could e.g. be a local clock starting to run.

An operator unit at the wireless remote control unit 230 receives the signal and, after a short duration associated with processing the signal, transmits a signal back to the transceiver at the vehicle unit 250. The transceiver at the vehicle unit 250 receives the signal transmitted from the operator unit and a second time stamp is generated, e.g. by stopping said local clock. The time of flight is then determined by first determining the total duration for the round trip and adjusting the roundtrip time by subtracting the duration it takes for the operator unit to process the received signal and transmit a signal in response. The distance between the work vehicle and the wireless remote control unit may then be determined by dividing the adjusted roundtrip time by 2 and multiply by the speed for a radio wave through air. The signals to and from the operator unit comprises an ID that is unique to the transceiver at the vehicle unit 250. That way the vehicle unit 250 may ensure that the signals received by the transceiver are based on signals having originated from the transceiver of the vehicle unit 250. In other words, the ID is information relevant for positioning of the wireless remote control unit 230.

The determined distance is then used by the vehicle unit 250 of the safety system 200 to provide at least one second control signal to the work vehicle 210 if the determined distance falls within a predetermined safety distance interval.

Since the position 260a of the transceiver with respect to the work vehicle is known, it may be used as an origin of the local coordinate system. Obtaining information relevant for positioning of the work vehicle is thus straight-forward; since the position of the transceiver is predetermined to be an origin of the local coordinate system, the position of the work vehicle is taken to be the position of the transceiver in the local coordinate system. In other words, the position of the work vehicle is at a distance measure of zero from the origin.

The transceiver 250 is arranged to provide a first time stamp when transmitting a signal to be received by an operator unit 255 arranged at the wireless remote control unit 230. The operator unit comprises a second transceiver arranged to receive the signal transmitted from the vehicle unit 250 and, in response to receiving said signal, transmit a time stamped signal back to the transceiver of the vehicle unit 250. When the vehicle unit receives the time stamped signal, the time stamp of the time stamped signal is compared to the first time stamp. By assuming a speed at which the signal travels, e.g. the speed of light for a radio signal, the distance between the work vehicle 210 and the wireless remote control unit 230 is determined. In other words, the time stamped signal received by the transceiver of the vehicle unit 250 corresponds to a signal carrying information relevant for positioning of the wireless remote control unit 230. The time stamp corresponds to the information relevant for positioning of the wireless remote control unit 230, since it corresponds to a time of flight, determined by a time difference of arrival. The vehicle unit 250 is further arranged to control a drive operation 290 of the work vehicle 210 by providing second control signals to the drive operation 290 if the determined distance falls within a predetermined safety distance interval. By periodically transmitting signals from the vehicle unit 250, via its transceiver, the distance between the work vehicle 210 and the wireless remote control unit 230 is always known and the safety system 200 may stop or slow down the work vehicle 210 if it gets too close or too far away from the wireless remote control unit 230, depending on how the safety system 200 is arranged. In other words, the vehicle unit 250 is arranged to provide a second control signal to the work vehicle 210, wherein the second control signal is arranged to control the drive operation 290 of the work vehicle 210 based on the periodic comparison.

FIG. 3 illustrates a safety system 300 for a remotely operated work vehicle 310, wherein the distance determination is based on a global coordinate system provided by a global navigational satellite system, GNSS, 375. A vehicle unit 350 is arranged at the work vehicle and is further arranged to receive a signal 320 that is periodically transmitted from an operator unit 355 arranged at a wireless remote control unit 330. In other words, a push-operation is used to transfer information relevant for positioning of the wireless remote control unit 330 from the wireless remote control unit 330 to the vehicle unit 350. Thus, the operator unit 355 is arranged to transmit at least one signal 320 carrying information $X'Y'Z'_{remote\ control}$ relevant for positioning of the wireless remote control unit 330 to the vehicle unit 350. The vehicle unit 350 further comprises a receiver arranged to receive at least one signal from the GNSS 375 carrying information relevant for positioning of the receiver in the global coordinate system. The information may be a set of coordinates relating to the global coordinate system. Since the receiver is arranged at the work vehicle 310, the position of the receiver corresponds to a position of the work vehicle. The coordinates received from the GNSS 375 are preferably corrected based on information provided by stationary references of the GNSS 375. For instance, the GNSS could be a differential global positioning system, DGPS, where global coordinates $XYZ_{work\ vehicle}$, $XYZ_{remote\ control}$ provided by the satellites of the DGPS are corrected using information $\Delta XYZ_{work\ vehicle}$, $\Delta XYZ_{remote\ control}$ from stationary references of the DGPS having known global coordinates.

According to some aspects, the vehicle unit 350 further comprises a processing element, wherein the processing element is communicatively connected to the drive operation 390 and wherein the processing element is arranged to control the drive operation 390 of the work vehicle 310 by providing the second control signal. The processing element may be arranged to receive information relating to roll, pitch heading or a temperature of the work vehicle, e.g. from corresponding sensors in the work vehicle 310, and base the provided second control signal on this information as well. In other words, the processing element may serve as an engine control unit where work vehicle system information and the spatial relationship between the work vehicle and the wireless remote control unit is processed together to provide the second control signal.

Additional features that provide enhanced functionality of a safety system according to the present disclosure will be discussed below. The features will provide the safety system with additional information on which the safety system may base the generation of control signals.

It may be desirable in some cases to determine if an operator has his back to the work vehicle during operational use. Therefore, according to some aspects, the vehicle unit and the wireless remote control unit each comprises direction detection means arranged to determine a direction of the work vehicle and the wireless remote control unit, respectively. The vehicle unit is further arranged to determine a relative direction between the determined directions of the work vehicle and the wireless remote control unit. The vehicle unit is also arranged to stop the work vehicle based on a predetermined relative direction criterion. For example, the vehicle unit and the wireless remote control unit may each comprise a pair of compasses. The direction indicated by the compass arranged at the wireless remote control unit is transmitted to the vehicle unit. The vehicle unit is further arranged to determine a relative direction between the determined directions of the work vehicle and the wireless remote control unit. By having a predetermined forward direction of the wireless remote control, the relative direction can then be used to determine if the forward direction is facing towards or away from the work vehicle. If the wireless remote control unit, and assumingly also the operator, is determined to be facing away from the work vehicle, a control signal is transmitted to the work vehicle. According to some aspects, the work vehicle is arranged to stop when the relative direction indicates that the wireless remote control unit is facing away from the work vehicle. In other words, the vehicle unit is arranged to stop the work vehicle based on a predetermined relative direction criterion.

The predetermined relative direction criterion may also be arranged to detect if an operator is at risk of losing focus of the task of operating the work vehicle. If, for instance, something happening behind the operator, e.g. a sudden loud sound, grabs the attention of the operator, the operator might start to turn around to face to object of his or her attention, and also start to face away from the work vehicle in doing so. The predetermined relative direction criterion may thus be arranged to control the drive operation of the work vehicle, e.g. stop or slow down the work vehicle, based on the operator rotating around his vertical axis faster than a predetermined speed and greater than a predetermined angle. For instance, predetermined relative direction criterion may be a 180 degree turn within two seconds.

One particular danger is that of the operator falling and becoming separated from the wireless remote control unit or falling in such a way that the operator quickly ends up in front of a moving work vehicle. An example of the latter could be an operator operating a trench compactor at the edge of a trench. The operator may be well outside a predetermined minimum safety distance, but a sudden slip could cause the operator to fall into the trench and land in front of the trench compactor. The safety system is preferably arranged to respond quickly in order to meet the associated rapid change of the operating situation.

Thus, according to some aspects the operator unit comprises a first orientation sensor, wherein the first orientation sensor is arranged to determine an acceleration and/or a change in orientation of the wireless remote control unit. The first orientation sensor may comprise an accelerometer to determine acceleration and a gyroscope to determine changes in orientation. In the example of the trench compactor, a quick change in acceleration may be interpreted as falling straight down in the trench. A sudden vertical acceleration may be used to indicate a dropped wireless remote control unit. A sudden horizontal acceleration may be used to indicate that wireless remote control unit has been suddenly separated from the operator. For instance, the wireless remote control unit may have been knocked away from the operator by accident. The change in orientation may be used to indicate that the operator is also rotating fast, i.e. the operator is falling. Any of the indications, singly or in combination, may constitute a basis for a predetermined criterion on which to stop the work vehicle. Thus, the vehicle unit is arranged to stop the work vehicle based on the determined acceleration and/or change in orientation meeting at least one predetermined criterion. According to some aspects, the operator unit is arranged to transmit signals comprising information relating to determined acceleration and/or change in orientation to the vehicle unit. The vehicle unit is preferably arranged to transmit a control signal arranged to stop the work vehicle based on the determined acceleration and/or change in orientation meeting at least one predetermined criterion.

Many work vehicles work are intended to be operated under harsh conditions, e.g. varying terrain and hot temperatures. Depending on the nature of said harsh conditions, the work vehicle may be adversely affected to pose a danger to the operator or the functionality of the safety system might risk getting compromised.

The automatic safety system of U.S. Pat. No. 8,672,582 B2 may be used to illustrate an automatic safety system not arranged to consider varying terrain. An operator of a work vehicle moving in a forward direction may walk close by as long as the operator is close to the rear of the work vehicle. The safety system detects that the work vehicle is moving away from the operator and allows continued operational use even though the operator is within the protective field of the rear detector. If the work vehicle tilts to the point where it falls over in the direction of the operator, there is no functionality in the automatic safety system to prevent the resulting accident.

Thus, according to some aspects of the present disclosure the vehicle unit comprises a second orientation sensor arranged to provide the vehicle unit with information relating to roll, pitch and heading of the work vehicle. The vehicle unit is further arranged to stop the work vehicle based on the information relating to roll, pitch and heading of the work vehicle meeting at least one predetermined criterion. According to some further aspects, the predetermined criterion is a maximally allowed roll and pitch, respectively. The maximally allowed roll and pitch may be further based on the heading of the work vehicle. The heading of the work vehicle may be used in conjunction with a determination of operator position to apply more a conservative predetermined criterion of the operator is or risk getting too close to a tilting work vehicle.

Another issue is the build-up of heat within a work vehicle during operational use. The work vehicle may generate a lot of heat itself and when operating in a hot environment, the build-up of heat may adversely affect electronics arranged at the work vehicle. In particular, any components of the safety system that are arranged at the work vehicle might run the risk of impaired functionality if the temperature gets too high. Therefore, according to some aspects, the vehicle unit comprises a temperature sensor, wherein the temperature sensor is arranged to provide the vehicle unit with information relating to a temperature of the work vehicle. The vehicle unit is further arranged to provide at least one second control signal based on the information relating to said temperature of the work vehicle meeting a predetermined criterion. The predetermined criterion may be a maximally allowable temperature of the work vehicle.

Figure 4:
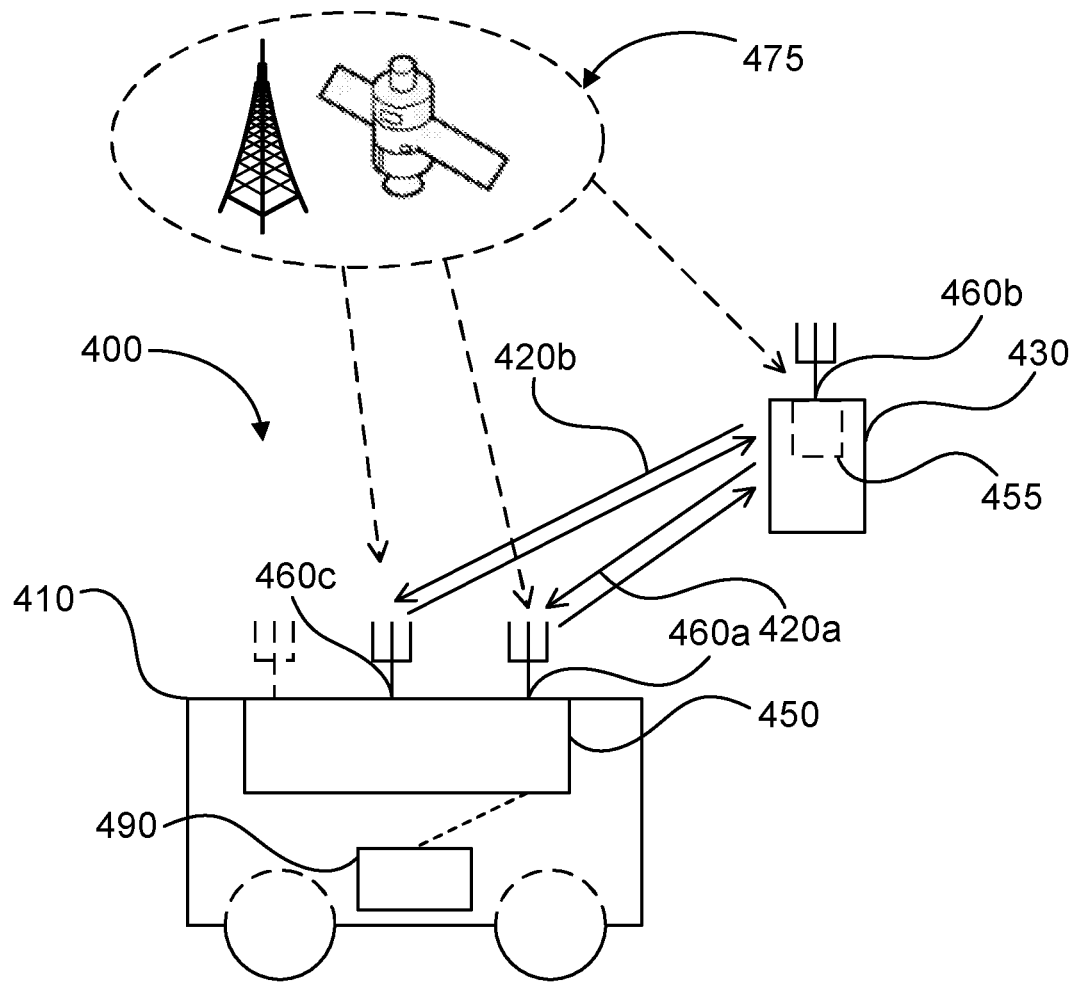
FIG. 4 illustrates preferred aspects of the safety system for a remotely operated work vehicle.

FIG. 4 illustrates preferred aspects of the safety system 400 for a remotely operated work vehicle 410. The work vehicle 410 is arranged to receive a first control signal (not shown) from a wireless remote control unit 430. The first control signal is arranged to control a drive operation 490 of the work vehicle 410. The safety system 400 comprises a vehicle unit 450 arranged at the work vehicle 410 and an operator unit 455 arranged at the wireless remote control unit 430. The vehicle unit 450 comprises a first and a second transceiver arranged at a first and a second transceiver position 460a, 460c, respectively. The operator unit 455 comprises a third transceiver arranged at a third transceiver position 460b. The first and second transceivers are arranged to communicate with the third receiver. The vehicle unit 450 further comprises a processing element, wherein the processing element is communicatively connected to the first transceiver and to the drive operation 490. The processing element is further arranged to control the drive operation 490 of the work vehicle 410 by providing a second control signal. By communicatively connecting the first transceiver to the drive operation via the processing element, a master node comprising the first transceiver may be defined. According to some aspects, the master node is further arranged to regulate the communication between the second and third transceivers and the master node. The safety system is arranged to direct all communication between the transceivers that is directly or indirect addressed to controlling the drive operation 490 to pass via the master node.

According to a first aspect, the safety system 400 is based on using two way time of flight ranging to determine a first and a second distance between the third transceiver position 460b at the wireless remote control unit 430 and the first and second transceiver positions 460a, 460c at the vehicle unit 450 and send control signals to the drive operation 490 via the master node based on the determined first and second distances.

The first and second transceivers are preferably ultra-wideband, UWB, transceivers arranged to transmit and receive a signal comprising a unique ID. The unique ID enables the UWB transceivers to correlate received signals with a specific origin. The third transceiver is preferably also an UWB transceiver of the same type as the first and second transceivers. The unique IDs then enable first and third transceivers to determine if a signal from the second transceiver was generated in response to a signal originating from the first or the third transceiver. In other words, the ID comprises information relevant for positioning of the wireless remote control unit. Ultra-wideband is a technology for wirelessly transmitting signals across a wide frequency spectrum. The wider the bandwidth, the more "square wave"-like the signal can be made, which correlates with a shorter rise time. The shorter rise time may be used to make it easier to determine if a "zero" or "one" is transmitted, which in turn may be used in synchronization of received and transmitted signals. In other words, the more "square wave"-like signal enables more precise time synchronization. The more precise time synchronization in turn leads to improved accuracy when measuring distances using a time of flight, ToF, approach. According to some aspects, the accuracy of time of flight distance measurements is around 10 cm. This is much more accurate than, e.g. distance measurements based on radio signal strength indicator, RSSI, using RFID technology, with a typical precision of about 20 cm. According to some aspects, the UWB transceivers are arrange to provide a maximum bandwidth of 500 MHz. According to some aspects, the UWB transceivers are arranged to operate in the GHZ frequency range. A UWB radio signal is far wider than typical radio signals in use today. The UWB aspect makes the corresponding UWB radio signals very robust against interference. The UWB transceivers are preferably arranged for coherent reception for maximum range and accuracy. According to some aspects, all UWB transceivers are arranged to transmit on the same frequency. The transceivers are further arranged to only communicate with units carrying IDs corresponding to IDs of a predetermined white list. The white list may be determined at initiation of the safety system by linking the first and third transceivers of the vehicle unit 450 to the second transceiver of the operator unit 430.

The first and third transceivers are each arranged to periodically transmit signals to the third transceiver. A first time stamp representing an initial time of the two-way ranging is generated at the same time a signal is transmitted to the (UWB) transceiver at the operator unit 455. The UWB transceiver at the operator unit 455 is arranged to transmit a signal 420a, 420b carrying a unique ID back to the first and third (UWB) transceivers when a signal from one of the first and second transceivers is received. When the signal 420a, 420b carrying the unique ID is received by the first and third transceivers, the ID is used to determine which of the first and third transceiver was used to trigger the transmission of the signal 420a, 420b. A second time stamp representing a finishing time of the two-way ranging is generated when the signal 420a, 420b is received. By comparing the first and second time stamps and assuming that the radio signal travels at the speed of light, the first and second distances can be determined by the vehicle unit 450.

When a radio signal passes a human body, it experiences a slight change in index of refraction, which affects the determined distance slightly. By determining distances with respect to two separate points at the vehicle unit 450, the likelihood that all determined distances are affected by human blocking is reduced. Additional UWB transceivers also provides redundancy if one transceiver should experience problems. According to some aspects, a third transceiver is arranged at the vehicle unit 450. Three transceivers at the work vehicle 410 enables the vehicle unit 450 to determine an exact position of the wireless remote control unit 430 based on triangulation.

In other words, we have continuous, bi-directional communication between UWB transceivers at the vehicle unit 450 and the UWB transceiver at the operator unit 455.

Operational use of the work vehicle 410 is allowed to continue as long as at least one of the distances is within a predetermined zone, e.g. greater than a certain distance, or in between a minimum distance and a maximum distance. Control circuitry of UWB master node is arranged to alert control circuitry of the work vehicle 410 upon leaving the predetermined zone. According to some aspects, the vehicle unit 450 is arranged to work with multiple zones. For instance, vehicle unit 450 is arranged to stop the work vehicle if the distance to the wireless remote control unit is within a first interval, slow down the work vehicle in a second distance interval and emit a warning signal within a third distance interval. According to some aspects, the wireless remote control unit 130 is arranged to emit a vibration, a visual signal and/or a sound if the distance between the work vehicle 110 and the wireless remote control unit 130 falls within the third distance interval.

The transceivers at the vehicle unit 450 together with the transceiver at the operator unit 455 form a communication link. The vehicle unit 450 is arranged to compare the time stamps of the signals passing over the communication link with a present time and determine if the received information is reliable based on the comparison. In other words, the time stamps are used as a link check to ensure reliability of the data and hence also the reliability of the determined first and second distances. The vehicle unit 450 is further arranged to provide message quality check, cyclic redundancy check and automatic acknowledgement of messages. In other words, the link itself is checked on every message but the safety system 400 also gets error codes from work vehicle positioning elements, e.g. transceivers or sensors of the vehicle unit 450, if something is wrong.

The distance between the transceivers at the vehicle unit 450 is known and may be used to provide additional system checks. The determined first and second distances, represented e.g. as vectors, should only differ by a vector corresponding to the distance between the transceivers at the vehicle unit 450. If the difference exceeds a predetermined threshold, it may be used as an indication that there is something wrong with at least one of the determined first and second distances.

The vehicle unit 450 is further arranged to report an error if any of the first and second distances are outside of the allowable interval.

The vehicle unit 450 preferably comprises a second orientation sensor arranged to provide the vehicle unit 450 with information relating to roll, pitch and heading of the work vehicle 410. The vehicle unit 450 is further arranged to stop the work vehicle 410 based on the information relating to roll, pitch and heading of the work vehicle meeting at least one predetermined criterion.

The vehicle unit preferably also comprises a temperature sensor, wherein the temperature sensor is arranged to provide the vehicle unit 450 with information relating to a temperature of the work vehicle. The vehicle unit 450 is further arranged to provide at least one second control signal based on the information relating to said temperature of the work vehicle exceeding a maximally allowable temperature.

According to some aspects, the UWB transceivers are Bluetooth compliant. This enables the transceivers at the vehicle unit to be paired with the transceiver at the operator unit 455. The pairing may be performed in different ways. The basic idea is to listen to the Bluetooth paring sequence and use Bluetooth to send a unique ID from the transceivers arranged at the vehicle unit to the transceiver arranged at the operator unit 455, which are paired on both ends of the UWB link. According to some aspects, the third transceiver is arranged to transmit its unique ID through the Bluetooth link. The master node is arranged receive the unique ID and transmit it to the slave node(s) arranged at the vehicle unit 450. If the first and third transceivers are within range of the second transceiver and have correct IDs they will be allowed to establish a link. According to some aspects, the vehicle unit 450 is arranged to pair the transceivers upon start up, wherein the two transceivers arranged at the vehicle unit 450 that are closest to the third transceiver are paired. By making sure that the first and second transceivers are closest during start up, they will be paired with the third transceiver.

The handling of several work vehicles in the same area is troublesome when we are at the same frequency. According to some aspects, if the safety system 400 detects another safety system, the one with the lowest unique ID will become master. The master then will send the "speech order" so that every safety system gets a timeslot. The master sends a synch signal and everyone knows when it's their time to transmit. The number of systems is limited by the update frequency and needed transmit time.

If the frequency by which signals are transmitted and received is much smaller than the frequency of empty time slots, it may not be necessary to implement a speech order. The likelihood of a collision, where two signals attempt to use the same time slot, may be so small that it is more efficient to simply assume that the signaling works, and try to retransmit if it is determined that a collision did occur. Thus, according to some aspects, signaling is performed without a predetermined speech order. According to some further aspects, the safety system 400 is arranged to detect a collision and retransmit a signal based on the detection of the collision.

According to some aspects, each transmitted signal comprises a checksum and the safety system 400 is arranged to perform a cyclic redundancy check after each transmission based on the checksum, the safety system 400 further being arranged to detect a collision based on the cyclic redundancy check. According to some further aspects, the safety system 400 is arranged to retransmit a signal based on detection of a collision after a predetermined duration. According to some further aspects, the predetermined duration is a few micro-seconds.

According to a second aspect, the safety system 400 is based on coordinates from a differential global navigational satellite system, DGNSS, e.g. differential GPS, to determine the first and a second distances. The vehicle unit 450 comprises a first and a second GPS receiver arranged to receive a first and a second vehicle coordinate signal comprising the GPS coordinates of first and second positions 460a, 460c of the vehicle unit 450. The operator unit 455 comprises a third receiver arranged to receive an operator coordinate signal comprising the GPS coordinates of the position 460b of the wireless remote control unit 430. GPS coordinates are typically accurate to within a few meters, which might be inadequate precision to ensure safe operation of the work vehicle. Thus, according to some further aspects the first, second and third receivers are further arranged to receive corrective information, the corrective information being based on predetermined GPS coordinates of at least one reference point. The at least one reference point may be geostationary reference points and/or reference points arranged at the work vehicle 410. The vehicle unit 450 is further arranged to improve the accuracy of the GPS coordinates of the positions of the work vehicle and the wireless remote control unit based on the corrective information. In other words, differential GPS is used to improve the accuracy down to decimeter accuracy.

The signaling to control the drive operation 490 may then be performed analogous to that of the aspects implementing a solution based on relative coordinates, as described above using time of flight.

Figure 5:
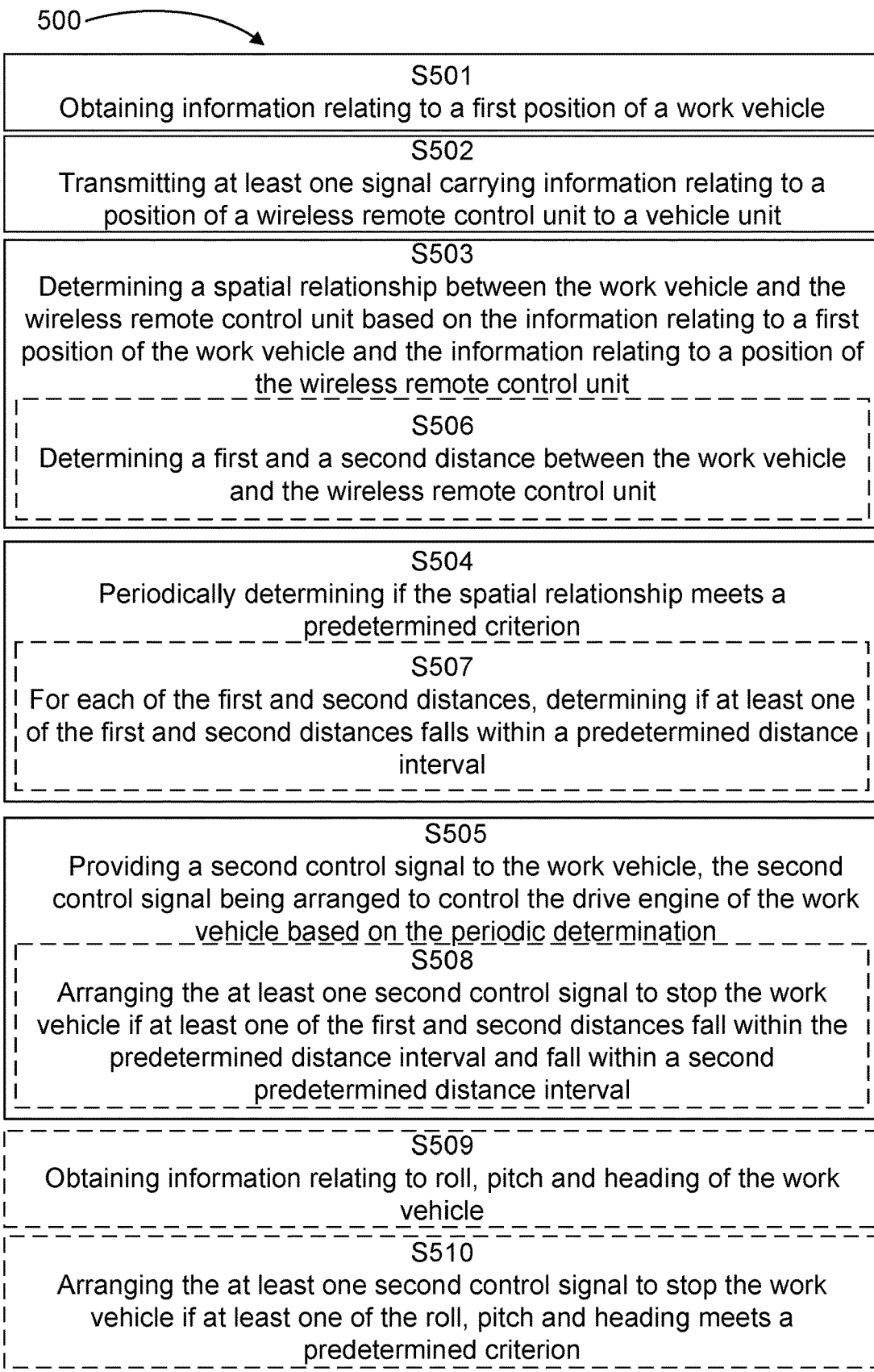
FIG. 5 illustrates method steps of a method performed in a safety system for a remotely operated work vehicle according to the present disclosure.

FIG. 5 illustrates method steps of a method 500 performed in a safety system for a remotely operated work vehicle. The work vehicle is arranged to receive a first control signal from a wireless remote control unit, the first control signal being arranged to control a drive operation of the work vehicle. The safety system comprises a vehicle unit arranged at the work vehicle and an operator unit arranged at the wireless remote control unit.

The method 500 performs the steps corresponding to the way the functional units have been disclosed in FIGS. 1-4. In other words, the method 500 carries out actions performed by the safety systems of any of FIGS. 1-4.

The method comprises obtaining S501 information relating to a first position of the work vehicle. The method further comprises transmitting S502 at least one signal carrying information relevant for positioning of the wireless remote control unit to the vehicle unit. As has been discussed above in relation to e.g. FIGS. 2 and 3, the information may be obtained by receiving coordinates from a global navigational satellite system, GNSS, or be deduced based on time stamps relating to when the signals have been transmitted and received.

The method 500 further comprises determining S503 a spatial relationship, e.g. a distance, between the work vehicle and the wireless remote control unit based on the information relating to a first position of the work vehicle and the information relevant for positioning of the wireless remote control unit. The method 500 also comprises periodically determining S504 if the spatial relationship meets a predetermined criterion and providing S505 a second control signal to the work vehicle, the second control signal being arranged to control the drive operation of the work vehicle based on the periodic determination.

According to some aspects, e.g. those disclosed in relation to FIG. 4, determining S503 the spatial relationship may further comprise the optional step of determining S506 a first and a second distance between the work vehicle and the wireless remote control unit. The step of periodically determining S504 if the spatial relationship meets a predetermined criterion may further comprise the optional step of, for each of the first and second distances, determining S507 if at least one of the first and second distances falls within a predetermined distance interval. The step of providing S505 a second control signal to the work vehicle may further comprise the optional step of arranging S508 the at least one second control signal to stop the work vehicle if at least one of the first and second distances fall within the predetermined distance interval and fall within a second predetermined distance interval. The determination of the two different distances provides redundancy and enables greater flexibility in how the safety system can respond to different situations. The second predetermined distance interval may be arranged to function as a sanity check, which will be elaborated further in relation to FIGS. 6 and 7 below.

The method advantageously takes into account information relating to the current drive status of the work vehicle. Thus, according to some aspects the method 500 further comprises obtaining S509 information relating to roll, pitch and heading of the work vehicle, and arranging S510 the at least one second control signal to stop the work vehicle if at least one of the roll, pitch and heading meets a predetermined criterion.

Figure 6:
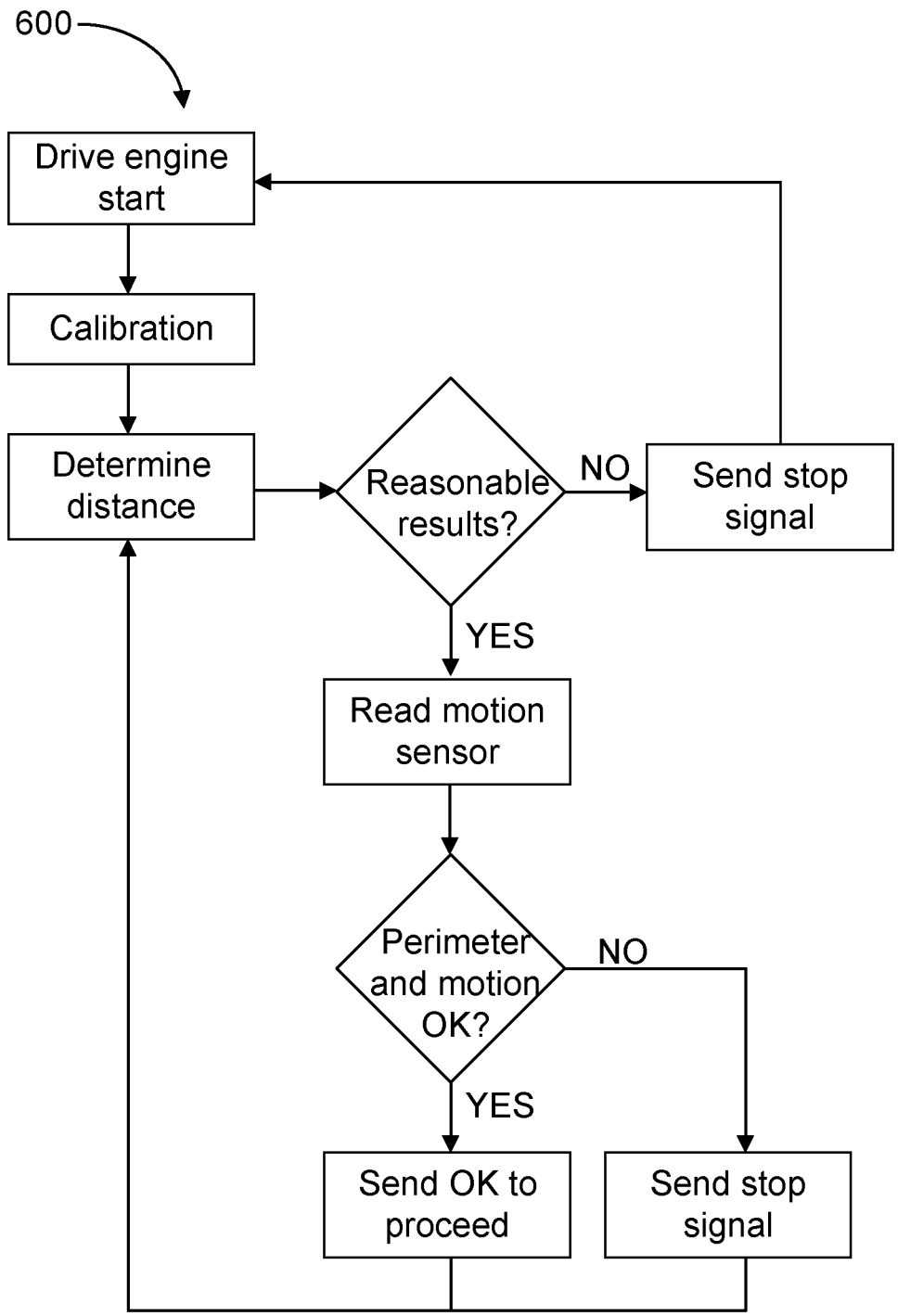
FIG. 6 illustrates a flow diagram according to some aspects of the present disclosure.

FIG. 6 illustrates a flow diagram according to some aspects of the present disclosure. Too ease the explanation, system units and their arrangements are referenced to those of the preferred aspects illustrated in relation to FIG. 4. However the flow diagram is not limited to the preferred aspects of FIG. 4. For instance, the distance determination and its evaluation described below is not limited to determining a two distances; the flow diagram applies to spatial relationships comprising any number of distances.

At some point after starting the work vehicle 410, the third transceiver at the operator unit 455 is paired with the first and second transceivers at the vehicle unit 410. The pairing may be performed immediately at start up or at a later stage during operational use using the Bluetooth compliant communication link, as described in relation to FIG. 4. During the pairing, unique IDs used to identify signal origins are determined. According to some aspects, a white list comprising a set of unique IDs which are associated with the safety system is also determined. Distances between the third transceiver at the operator unit 455 and the transceivers at the vehicle unit 410 are periodically determined and evaluated. The evaluation comprises determining if either distance is within a predetermined safety zone. The evaluation may also comprise a sanity check, which may be used to detect problems with determining the first and second distances. Examples further illustrating this part will be given below in relation to FIG. 7. If it is determined that the wireless remote control unit 430, and hence the operator using the same, is at an appropriate distance the method is arranged to proceed to examine additional parameters relating to the current operational conditions, and if the wireless remote control unit 430 is too close or too far away with respect to the work vehicle 410, a stop signal is transmitted to the drive operation of the work vehicle 410. If the current operational conditions, e.g. roll, pitch and heading of the work vehicle 410, are considered to be safe, the work vehicle 410 is allowed to proceed, and a stop signal arranged to stop the work vehicle 410 is transmitted if not. As long as the method does not find a need to intervene with the operational use of the work vehicle 410, the method proceeds with the periodic determination and evaluation of the first and second distances.

Figure 7:
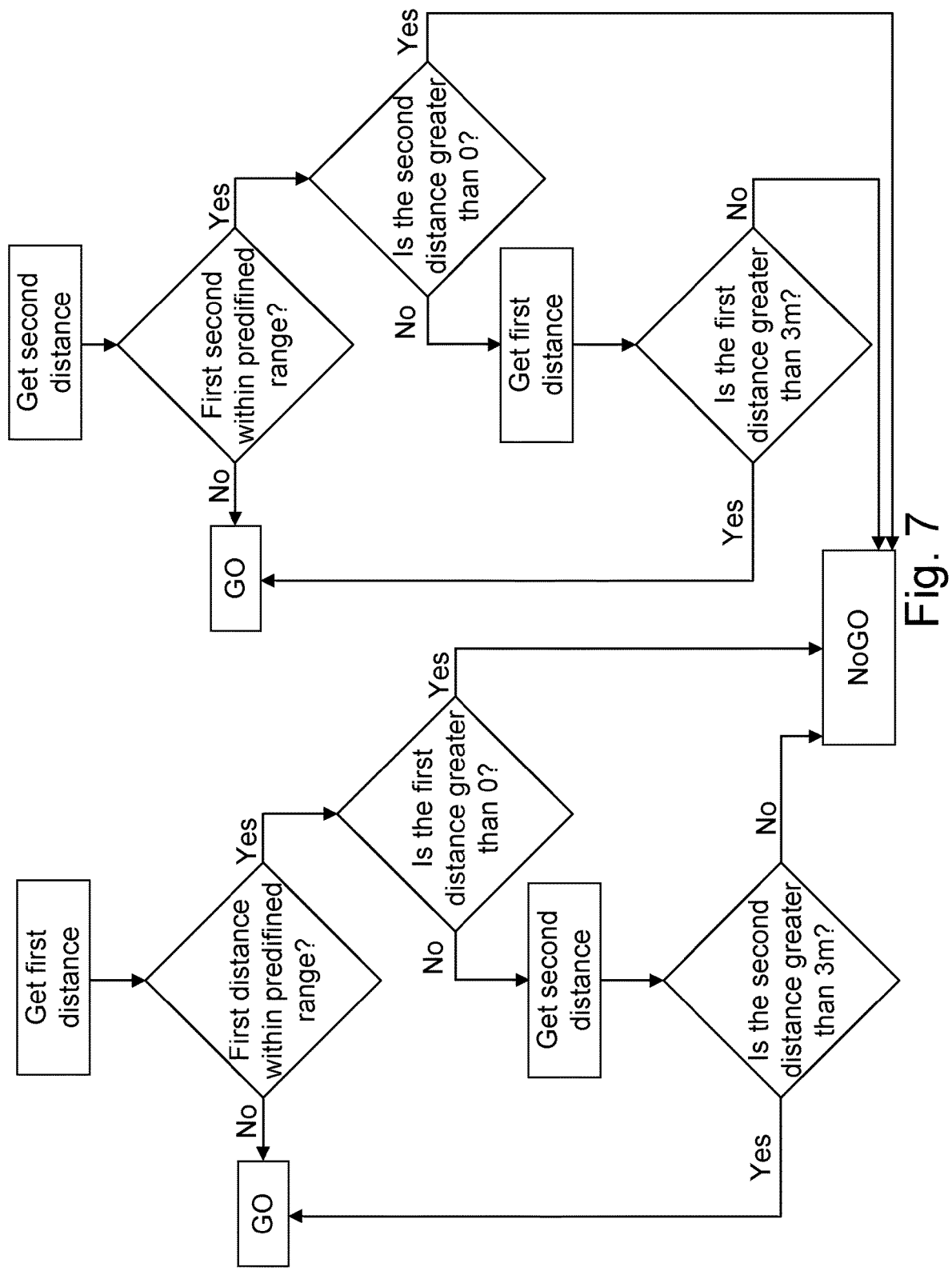
FIG. 7 illustrates a flow diagram relating to evaluation of determined distances.

FIG. 7 illustrates a flow diagram relating to evaluation of determined distances. The flow diagram is illustrated for two distances, such as the first and second distance described in relation to FIGS. 4 and 6 above, but the principles apply to any number of distances greater than two as well. The flow diagram of FIG. 7 is an example of what may take place in the steps of "Determine distance" and evaluate if the safety system got "Reasonable results?" in FIG. 6. The first and second distance are obtained e.g. as described with reference to FIG. 4. They are each compared to a first safety distance interval. For example, the first and second distances are checked to see if either of them are within 0 m and 2 m. In other words, the system tries to determine if the wireless remote control unit is within 2 m of the work vehicle 410. Since the work vehicle 410 usually has a front and a rear end, the first and second distances may measure the distance of the wireless remote control unit 430 to the front and the rear end, respectively. If the wireless remote control unit 430 is found to be further than 2 m away from both ends of the work vehicle, both vehicle positioning elements transmit a respective GO signal, wherein the GO signal is arranged to allow continued operational use of the work vehicle 410 without any intervening actions taken by the safety system 400.

Now, turning to the evaluation of the first distance (the left side of FIG. 7; the corresponding steps are taken with regards to the evaluation of the second distance). If the first distance is found to be less than 2 m, it needs to be determined if this is reliable or not. The method performs a check if the vehicle positioning element has sent a real value or an error. In FIG. 7, the error is represented by a distance of 0 m, but could in principle take on any value. The value is preferably selected such that is practically impossible to misinterpret.

A value greater than 0 m, but still less than 2 m would thus indicate a successful measurement telling the safety system 400 that the wireless remote control unit 430 is too close, less than 2 m from the work vehicle 410. The method comprises transmitting a NoGO signal, the NoGO signal being arranged to stop the work vehicle 410.

If instead an error value was received, indicating that the determination of the first distance was unsuccessful or otherwise unreliable, the second distance might still be used as a redundancy. The minimum safety distance of 2 m assumes a certain precision associated with both the first and the second distance being determined properly. Thus, if one distance determination fails, it may be necessary to increase the minimum safety distance. According to some aspects, an approximate length of the work vehicle 410 is added to the minimum safety distance when one of the first or second distances failed to be determined. FIG. 7 illustrates the second distance being evaluated against a minimum safety distance of 3 m. The value of 3 m is only for illustrative purposes and could in principle be any number resulting in an increase of the minimum safety distance. If the second distance passes the wider safety distance interval, the method transmits a GO signal; otherwise a NoGO signal is transmitted. Thus, for each distance to be determined, a corresponding GO or NoGO signal is provided. The two (or more) resulting GO/NoGO signals are then evaluated by an AND function and passed on to downstream functions. That is, only if two GO signals are provided is the work vehicle 410 allowed to proceed, otherwise a NoGO signal is provided and the work vehicle 410 is stopped.

FIG. 8 illustrates control signaling according to some aspects. The control signals are GO/NoGO signals as discussed in relation to FIG. 7 and "Forward, Reverse, Left, Right" refers to possible directions of movement of a work vehicle. The example is provided for a work vehicle having four drum drive with two different speeds and two directions, controlled via two hydraulic valves; one for speed selection and the other for direction. The signaling illustrated in FIG. 8a uses four AND gates where the GO/NoGO signals are arranged on one pin of a respective AND gate and the desired direction of movement on another. FIG. 8b illustrates an example where the work vehicle is receives first control signals from the wireless remote control unit indicating a desired movement forward combined with a right turn. However, only movement forward and left turns are allowed based on the Go/NoGO signals. Depending on the safety system, the work vehicle may be allowed to move forward, which is the only desired direction given a GO signal, or the work vehicle is stopped because the system requires all desired directions of movement to be allowed via respective GO signals.

Figure 9:
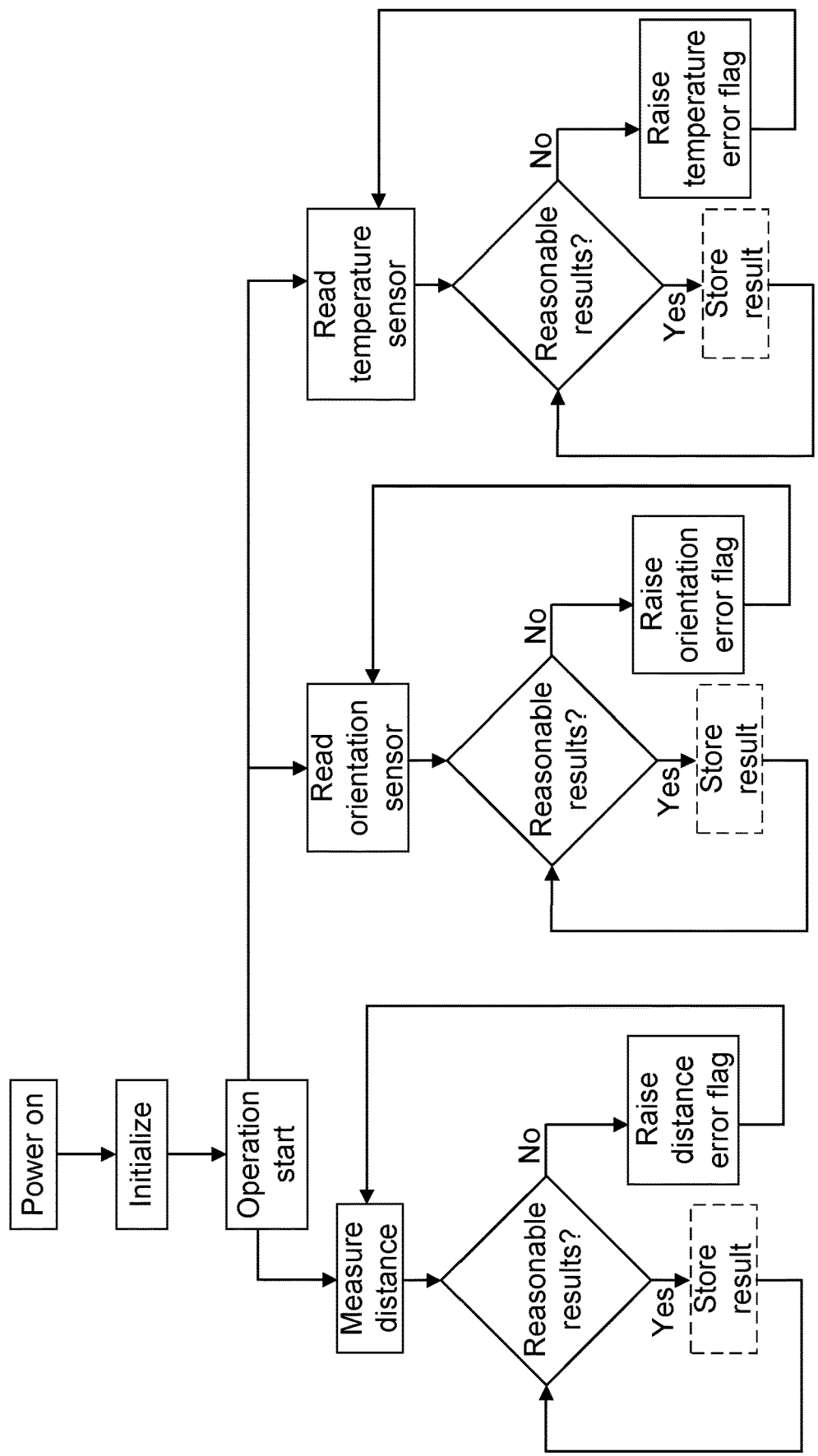
FIG. 9 illustrates a flow diagram according to some aspects of the present disclosure.

FIG. 9 illustrates a flow diagram according to some aspects of the present disclosure. The flow diagram is meant to illustrate how the work vehicle 410 of FIG. 4 takes into account information from an orientation sensor and a heat sensor in addition to the two distances it is arranged to determine. The lower left loop starting with "measure distance" corresponds to "determine distance" and "reasonable results" of FIG. 6, which has been further illustrated in different aspects in FIGS. 7 and 8. The loops starting with "read orientation sensor" and "read temperature sensor" receives measurements from respective sensors and checks if the measurements are reasonable. Analogous to the distance measurement, the orientation sensor data and the temperature data may comprise orientation and temperature values that are unreasonable to indicate that an error in the measurement process has occurred. The vehicle unit 450 may be based on a CAN bus system, where measurement data is stored in the different nodes and requested periodically by the master node for evaluation. The optional steps "store result" is meant to illustrate that the nodes of the work vehicle 410 may comprise memory arranged to store the measurement data until it is either overwritten or retrieved by the master node.

Figure 10:
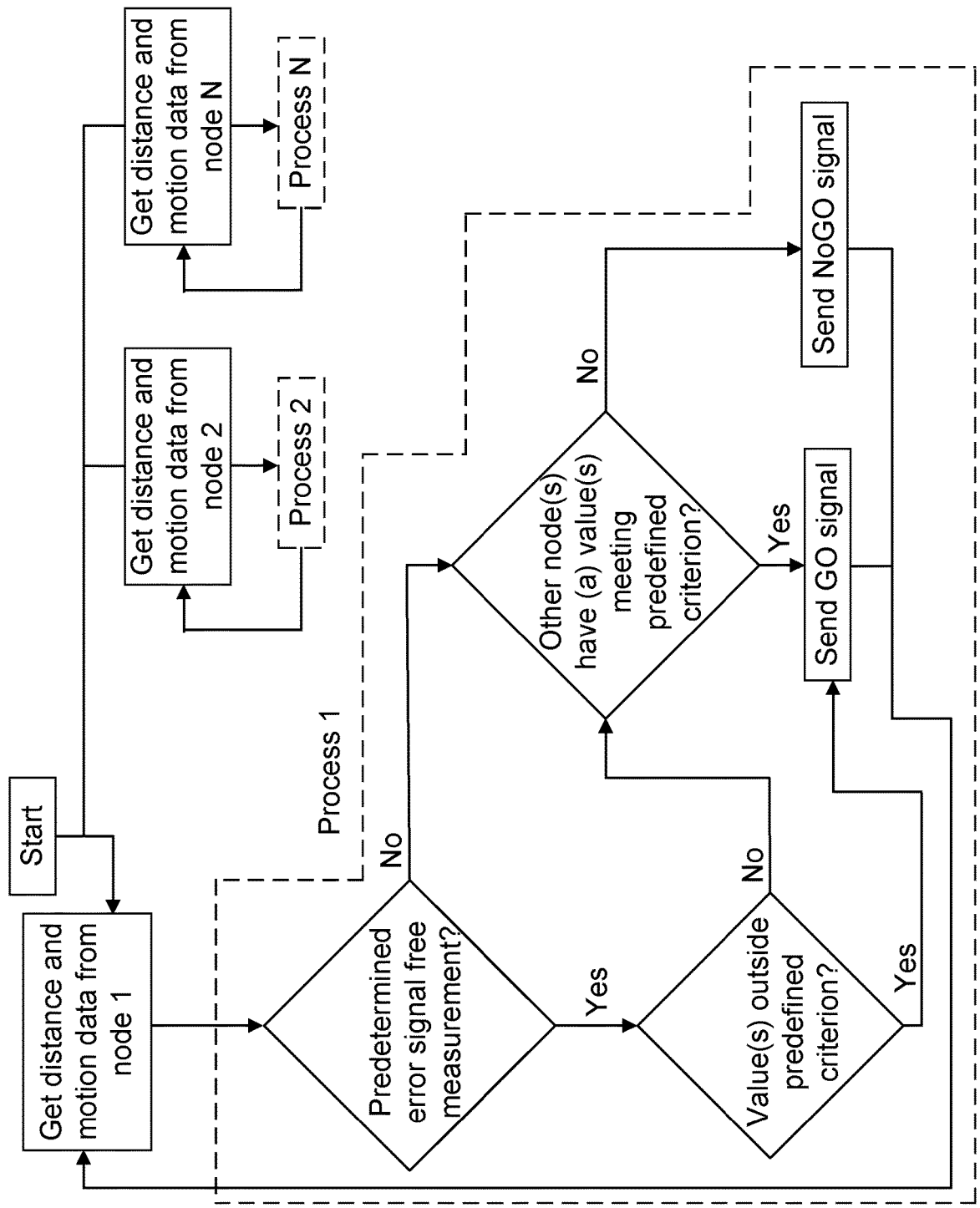
FIG. 10 illustrates a flow diagram according to some aspects of the present disclosure.

FIG. 10 illustrates a flow diagram according to some aspects of the present disclosure. The flow diagram is meant to illustrate distance determination for a vehicle unit 450, such as the one of the work vehicle 410 in FIG. 4, wherein the vehicle unit comprises a plurality of nodes, each arranged to determine a distance between the work vehicle 410 and the wireless remote control unit 430. The figure illustrates N processes, wherein each process corresponds to a process such as the ones illustrated in FIG. 7. Instead of only two distances being determined, we here have N distances that are being determined. The step "predetermined error signal free measurement" looks for error messages in the signals, such as the "zero distance" of FIG. 7. If no error is reported, the vehicle unit 450 proceeds to check if the distance is within a predetermined interval. Depending on the outcome of distance determination of other nodes, as will be described below, the safety system 400 may be arranged such that the work vehicle 410 is slowed down or stopped if the determine distance is below the lower bound of the predetermined interval and arranged such that the wireless remote control unit 430 emits a warning signal, e.g. a vibration, sound or visual signal, if the determined distance is greater than the upper bound of the predetermined interval.

If the determined distance falls outside the predetermined interval, the outcomes of the distances determined by the other nodes are also considered. The safety system 400 will issue a Go or NoGO signal depending on the other determined distances. For instance, an operator may be allowed to walk behind a work vehicle 410 moving in a forward direction, even if the operator is considered to be too close to a rear position of the work vehicle.

The disclosure also relates to a computer program comprising computer program code which, when executed, causes a safety system according to the present disclosure to carry out an aspect according to the disclosed method.

The safety system is also applicable to situations where two or more work vehicles are operating autonomously. Consider, for illustrative purposes, two work vehicles that are arrange to operate autonomously, i.e. without the need from an operator. The vehicle unit may then be arranged in one of the work vehicles and the operator unit in the other vehicle. The safety system is arranged analogous to the principles of geo-fencing, with the work vehicle having the operator unit being "fenced in" by the (one or more) work vehicle(s) having vehicle units arranged to communicate with the operator unit. The work vehicle having the operator unit may be arranged to transmit warning signals to other work vehicles entering a predetermined distance interval from the work vehicle having the operator unit. According to some aspects, the wireless remote control unit further comprises an external control unit. The external control unit is a unit that is not arranged at a work vehicle and serves as a central control node arranged to transmit first control signals to the two (or more) work vehicles.

In addition to protecting the operator, the safety system may also be arranged to protect other people. For instance, the safety system may comprise a plurality of personnel units having functionality arranged to enable determining a spatial relationship between the personnel unit and the work vehicle, the functionality being similar to that of the operator unit of a wireless remote control. The personnel units may then be worn by people other than the operator and the vehicle unit of the work vehicle may determine if a person other than the operator of the work vehicle has a spatial relationship to the work vehicle meeting a predetermined criterion, e.g. the person other than the operator being within a predetermined distance from the work vehicle.

In the context of the present disclosure, the term work vehicle is used to denote vehicles designed for road construction work, e.g. compactors. The safety system is also applicable for other types of remotely operated heavy vehicles dedicated for specific work tasks, e.g. for remotely operated industrial trucks and vehicles used in mining operations.

The invention claimed is:

1. A safety system comprising:
   a wireless remote control unit comprising an operator unit; and
   a work vehicle comprising a vehicle unit, the work vehicle being configured to receive a first control signal from the wireless remote control unit, the first control signal being arranged to control a drive operation of the work vehicle;
   wherein the operator unit is configured to transmit at least one signal carrying information relevant for positioning of the wireless remote control unit to the vehicle unit;
   wherein the vehicle unit is configured to:
      obtain information relating to a first position of the work vehicle,
      determine a spatial relationship between the work vehicle and the wireless remote control unit based on the information relating to a first position of the work vehicle and the information relevant for positioning of the wireless remote control unit,
      periodically determine if the spatial relationship meets a predetermined criterion, and
      provide a second control signal to the work vehicle to control the drive operation of the work vehicle based on the periodic determinations;
   wherein the work vehicle comprises an ultra-wideband, UWB, transceiver configured to transmit and receive signals comprising respective time stamps and respective unique IDs;
   wherein the spatial relationship comprises a first distance between the work vehicle and the wireless remote control unit; and
   wherein the predetermined criterion comprises the first distance falling within a predetermined distance interval;
   wherein the vehicle unit is configured to determine the first distance using two-way ranging time of flight based on a time stamp based on the information relating to a position of the work vehicle that is time stamped at an initial time of the two-way ranging and a time stamp based on a received signal that is time stamped at a finishing time of the two-way ranging.

2. The safety system according to claim 1, wherein the vehicle unit further comprises a processing element, wherein the processing element is communicatively connected to the drive operation, and wherein the processing element is arranged to control the drive operation of the work vehicle by providing the second control signal.

3. The safety system according to claim 2, wherein the processing element further comprises processing circuitry arranged to receive the information relating to a first position of the work vehicle and the information relevant for positioning of the wireless remote control unit, and wherein the processing circuitry is further arranged to determine said spatial relationship and generate the second signal based on whether the spatial relationship meets the predetermined criterion.

4. The safety system according to claim 1, wherein the second control signal is arranged to stop movement of the work vehicle if the work vehicle enters the predetermined distance interval.

5. The safety system according to claim 1, characterized in that the vehicle unit comprises a first transceiver and the operator unit comprises a second transceiver, wherein the first transceiver is arranged to transmit an initiation signal at said initial time to the second transceiver, and wherein second transceiver is arranged to receive the initiation signal and transmit a response signal to the first transceiver, the response signal comprising said time stamp for the finishing time.

6. The safety system according to claim 1, wherein the information relevant for positioning of the work vehicle comprises information relating to a second position of the work vehicle, wherein the spatial relationship further relates to a second distance between the work vehicle and the wireless remote control unit based on the second position, and wherein the predetermined criterion comprises the second distance falling within a second predetermined distance interval.

7. The safety system according to claim 1, wherein the vehicle unit and the wireless remote control unit each comprises direction detection means arranged to determine a direction of the work vehicle and the wireless remote control unit, respectively, wherein the vehicle unit is further arranged to determine a relative direction between the determined directions of the work vehicle and the wireless remote control unit, and wherein the vehicle unit is arranged to stop the work vehicle based on a predetermined relative direction criterion.

8. The safety system according to claim 1, wherein the operator unit comprises a first orientation sensor, wherein the first orientation sensor is arranged to determine an acceleration or a change in orientation of the wireless remote control unit, and wherein the vehicle unit is arranged to stop the work vehicle based on the determined acceleration and/or change in orientation meeting at least one predetermined criterion.

9. The safety system according to claim 8, wherein the vehicle unit comprises a second orientation sensor arranged to provide the vehicle unit with information relating to roll, pitch and heading of the work vehicle, wherein the vehicle unit is further arranged to stop the work vehicle based on the information relating to roll, pitch and heading of the work vehicle meeting at least one predetermined criterion.

10. The safety system according to claim 1, wherein the vehicle unit comprises a temperature sensor, wherein the temperature sensor is arranged to provide the vehicle unit with information relating to a temperature of the work vehicle, wherein the vehicle unit is further arranged to provide at least one second control signal based on the information relating to said temperature of the work vehicle meeting a predetermined criterion.

11. A method performed in a safety system for a remotely operated work vehicle, the work vehicle being arranged to receive a first control signal from a wireless remote control unit, the first control signal being arranged to control a drive operation of the work vehicle, wherein the safety system comprises the wireless remote control comprising an operator unit and the work vehicle comprising a vehicle unit, the work vehicle further comprising an ultra-wideband, UWB, transceiver arranged to transmit and receive signals comprising a unique ID and a time stamp, wherein the method comprises:
    obtaining information relating to a first position of the work vehicle, the information relating to a first position of the work vehicle comprising a first time stamp of an initial time;
    transmitting, at the initial time, at least one signal carrying information relevant for positioning of the wireless remote control unit to the vehicle unit, the information relevant for positioning comprising a first unique ID and the first time stamp;
    determining, based on the first unique ID and using two-way ranging time of flight, a spatial relationship between the work vehicle and the wireless remote control unit based on the information relating to a first position of the work vehicle and the information relevant for positioning of the wireless remote control unit, wherein the two-way ranging time of flight is based on the first time stamp and a second time stamp at a finishing time of the two-way ranging;
    periodically determining if the spatial relationship meets a predetermined criterion; and
    providing a second control signal to the work vehicle to control the drive operation of the work vehicle based on the periodic determination.

12. The method according to claim 11, wherein determining the spatial relationship further comprises
    determining a first and a second distance between the work vehicle and the wireless remote control unit;
    wherein periodically determining if the spatial relationship meets a predetermined criterion further comprises
    for each of the first and second distances, determining if at least one of the first and second distances falls within a predetermined distance interval; and wherein providing a second control signal to the work vehicle further comprises
    arranging the at least one second control signal to stop the work vehicle if at least one of the first and second distances fall within the predetermined distance interval and fall within a second predetermined distance interval.

13. The method according to claim 11, wherein the method further comprises:
    obtaining information relating to roll, pitch and heading of the work vehicle; and
    arranging the at least one second control signal to stop the work vehicle if at least one of the roll, pitch and heading meets a predetermined criterion.

14. A non-transitory computer readable medium comprising computer program code which, when executed, causes a safety system to carry out the method according to claim 11.

\* \* \* \* \*